(12) United States Patent
Altheimer et al.

(10) Patent No.: US 7,472,992 B2
(45) Date of Patent: Jan. 6, 2009

(54) SERIES OF SPECTACLE LENSES AND ASSOCIATED PRODUCTION METHOD

(75) Inventors: Helmut Altheimer, Baisweil-Lauchdorf (DE); Gregor Esser, Munich (DE); Wolfgang Becken, Munich (DE); Werner Mueller, Oetisheim (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 11/942,274

(22) Filed: Nov. 19, 2007

(65) Prior Publication Data

US 2008/0158507 A1 Jul. 3, 2008

Related U.S. Application Data

(63) Continuation of application No. PCT/EP2006/003826, filed on Apr. 25, 2006.

(30) Foreign Application Priority Data

May 19, 2005 (DE) .................. 10 2005 023 126.8

(51) Int. Cl.
*G02C 7/02* (2006.01)
(52) U.S. Cl. ...................... 351/159; 351/177
(58) Field of Classification Search .................. 351/159, 351/163–177
See application file for complete search history.

(56) References Cited

U.S. PATENT DOCUMENTS

| | | | |
|---|---|---|---|
| 3,687,528 | A | 8/1972 | Maitenaz |
| 3,960,442 | A | 6/1976 | Davis et al. |
| 4,606,622 | A | 8/1986 | Fuëter et al. |
| 5,784,144 | A | 7/1998 | Kelch et al. |

(Continued)

FOREIGN PATENT DOCUMENTS

DE 1805561 A1 5/1969

(Continued)

OTHER PUBLICATIONS

International Search Report dated Apr. 25, 2006.

(Continued)

*Primary Examiner*—Darryl J Collins
(74) *Attorney, Agent, or Firm*—Crowell & Moring LLP

(57) ABSTRACT

A series of spectacle lenses, where the position of use of the spectacle lenses in front of the eyes of the respective spectacle wearers, nominal variables at the intersection points of first lines of sight are essentially identical to the respective eye-sided or object-sided surfaces of the spectacle lenses. Each first line of sight is a predetermined, eye-sided line of sight, that intersects a pupil center point and an optical eye rotation point of the respective eye. All of the first lines of sight exhibit a predetermined, identical eye-sided visual angle. The nominal variables for each intersection point consist of one or more of a maximum permissible difference between a predefined value of a spherical refractive power and an actual value of a spherical refractive power in the position of use, a maximum permissible difference between a predefined value of an astigmatism and an actual value of an astigmatism in the position of use, a maximum permissible difference between a predefined value of a cylinder axis position and an actual value of a cylinder axis position in the position of use of the respective spectacle lens of the series as well as a method for the production of a spectacle lens.

15 Claims, 4 Drawing Sheets

U.S. PATENT DOCUMENTS

| | | |
|---|---|---|
| 6,789,895 B2 | 9/2004 | Shirayanagi |
| 7,111,937 B2 * | 9/2006 | Landgrave et al. .......... 351/177 |
| 7,249,850 B2 * | 7/2007 | Donetti et al. .............. 351/176 |

FOREIGN PATENT DOCUMENTS

| | | |
|---|---|---|
| DE | 2044639 | 3/1971 |
| DE | 3016935 C2 | 11/1981 |
| DE | 4012609 A1 | 10/1991 |
| DE | 19612284 A1 | 10/1997 |
| DE | 10151136 A1 | 4/2002 |
| DE | 10345214 A1 | 4/2005 |
| GB | 1369380 A | 10/1974 |

OTHER PUBLICATIONS

German Office Action dated Jun. 14, 2006 w/English translation.

\* cited by examiner

Figur 1

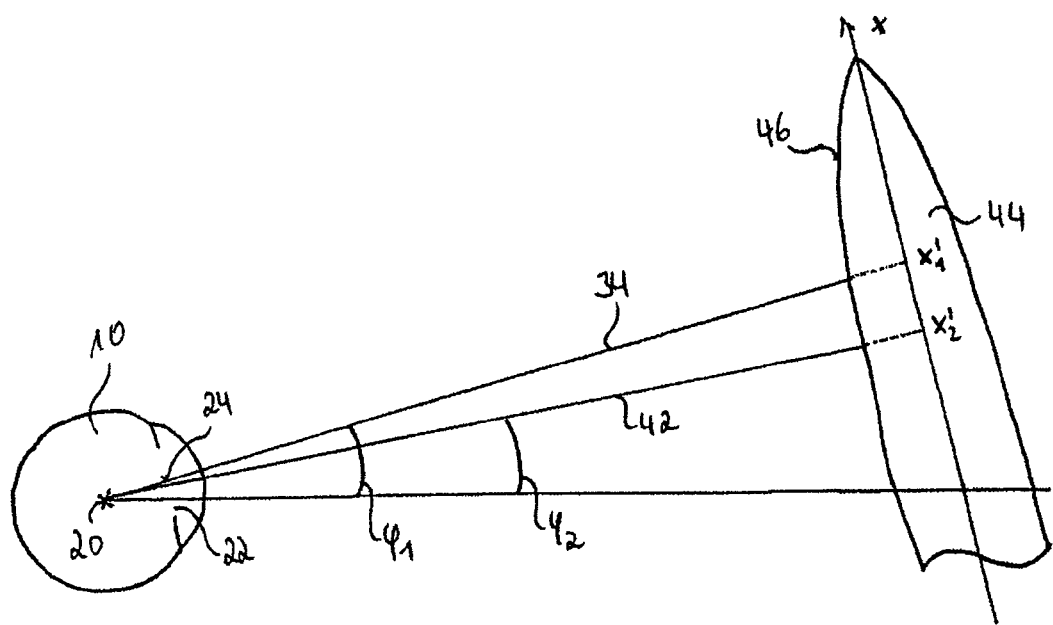
Figur 4

SERIES OF SPECTACLE LENSES AND ASSOCIATED PRODUCTION METHOD

CROSS-REFERENCE TO RELATED APPLICATIONS

This application is a continuation of PCT International Application No. PCT/EP2006/003826, filed on Apr. 25, 2006, which claims priority under 35 U.S.C. § 119 to German Application No. 10 2005 023 126.8, filed May 19, 2005, the entire disclosures of which are expressly incorporated by reference herein.

BACKGROUND AND SUMMARY OF THE INVENTION

The present invention relates to a series of spectacle lenses and a method for the production of a spectacle lens.

Conventional progressive lenses are distinguished by an area for distance vision (hereinafter referred to as the distance zone) and an area for near vision (hereinafter referred to as the near zone). The distance zone is usually arranged in an upper area; and the near zone, in a bottom area of the spectacle lens. A distance reference point is a point of the distance zone, at which the prescribed distance power, i.e., in particular the prescribed spherical power is achieved. A near reference point is a point of the near zone, at which the near power, i.e., the distance power plus addition is achieved. In a prism reference point the prismatic effect, in particular the prism and the prism thinning, is achieved.

In a so-called transition or progressive zone, the refractive power of a progressive lens increases progressively from the distance zone to the near zone. The increase in the refractive power from the distance zone to the near zone corresponds to the addition. In the progressive zone it is possible to see clearly the intermediate distances.

It is well known that in the production of progressive spectacle lenses the surface design of the progressive spectacle lenses is highly dependent on the prescription, in particular on the base curve and the addition. The surface properties of progressive lenses vary widely as a function of the various prescriptions, in order to exhibit the same imaging properties in the position of use thus, in the position, in which the spectacle lens is located in front of an eye of a spectacle wearer. In the case of two spectacle lenses exhibiting identical addition, but different spherical prescriptions, the corresponding surfaces differ not only in the surface power in order to achieve the different power, but also in the surface astigmatism in order to cope with varying optical paths. As a consequence, methods have been developed to achieve visual defects of similar size independently of the base curve.

Furthermore, it is known that the imaging properties inside a base curve can vary widely, because different spherical and astigmatic prescriptions can be produced from a progressive surface by varying the prescription surface. In order, however, to carry this out optimally, the surface properties of the progressive surfaces must change. As a consequence, instead of the single spherical or toric prescription surfaces, atoric prescription surfaces are used. The necessary surface modifications were produced with the atoric, instead of the progressive, surface, in order to achieve the same properties in the position of use.

Finally it is also known that not only the prescription (that is, the desired spherical, cylindrical and prismatic effect) has an influence on the position of use and must be compensated for by the shape of the progressive surface, but also the arrangement of the spectacle lens in front of the eye has an effect. Parameters, which have also been taken into consideration, are the pupil distance, the cornea vertex distance, the pantoscopic angle of the spectacle lens and the frame disk angle. These and other parameters comprise the customer-specific parameters. Taking into consideration the customer-specific parameters, the progressive surfaces of progressive spectacle lenses are calculated and finished for the specific customer.

The object of the present invention is to provide spectacle lenses that give the spectacle wearer an enhanced feeling of visual quality.

This object is achieved with the series of spectacle lenses, as claimed in claim 1, and the method for producing a spectacle lens, as claimed in claim 7. Preferred embodiments and design variants are the subject matter of the dependent claims.

As one example, the maximum permissible difference between a predefined value of a spherical refractive power and an actual value of a spherical refractive power in the position of use may be approximately 1.0 dpt, 0.5 dpt or 0.12 dpt.

As a further example, the maximum permissible difference between a predefined value of an astigmatism and an actual value of an astigmatism in the position of use may be approximately 1.0 dpt, 0.5 or 0.12 dpt.

As yet further example, the maximum permissible difference between a predefined value of a cylinder axis position and an actual value of a cylinder axis position in the position of use may be approximately 25°, 10° or 2°.

One aspect of the present invention provides a series of spectacle lenses, wherein each spectacle lens of the series comprises an eye-sided surface and an object-sided surface; the eye-sided and/or the object-sided surface of each spectacle lens of the series is designed in such a manner that in the position of use of the spectacle lenses in front of the eyes of the respective spectacle wearers, the nominal variables at the intersection points of the first lines of sight are essentially identical to the respective eye-sided or object-sided surfaces of the spectacle lenses; each first line of sight is a predetermined, eye-sided line of sight, which intersects a pupil center point and an optical eye rotation point of the respective eye; and all of the first lines of sight exhibit a predetermined, identical eye-sided visual angle; the nominal variables for each intersection point consist of a maximum permissible difference between a predefined value of a spherical refractive power and an actual value of a spherical refractive power in the position of use, and/or a maximum permissible difference between a predefined value of an astigmatism and an actual value of an astigmatism in the position of use, and/or a maximum permissible difference between a predefined value of a cylinder axis position and an actual value of a cylinder axis position in the position of use of the respective spectacle lens of the series.

The technical terms that are used correspond to the technical terms, as defined in the pertinent standards, such as DIN EN ISO 8624, DIN 58208, DIN EN ISO 13666, DIN 5350 and DIN EN ISO 8980-2. Furthermore, in addition to the cited standards, reference is made to the definitions in the technical manual "Optics of the Eye and Visual Aids", by Dr. Roland Enders, 1995, Optische Fachveröffentlichung GmbH, Heidelberg, and in the technical manual "Optics and the Technology of Spectacles" by Heinz Diepes and Ralf Blendowski, 2002, Verlag Optische Fachveröffentlichung GmbH, Heidelberg. For the definition of terms, the cited standards and the cited books are an integral part of the disclosure of the present patent application.

The position of use may be defined, for example, by means of a standardized position of use. In using the spectacle lenses of the series according to a standardized position of use, the eye rotation center distance is approximately 27.4 mm or approximately 27.9 mm or approximately 28.5 mm or approximately 28.8 mm; the forward tilt, i.e., the pantoscopic angle is approximately 8 deg.; the face form angle is approximately 0 deg.; the pupil distance is approximately 63 mm; the cornea vertex distance is approximately 15 mm; the object distance in the distance reference point is approximately 0 dpt; and the object distance in the near reference point is approximately –2.5 dpt.

Preferably the eye-sided and/or object-sided surface of each spectacle lens of the series of spectacle lenses is configured in such a manner that each spectacle lens can be arranged in front of precisely one eye of precisely one spectacle wearer. With such a configuration of the eye-sided or object-sided surface, the above design can be simplified for a first line of sight. The first line of sight of the spectacle wearer is a stationary coordinate system of a head of the spectacle wearer. The first line of sight is preferably defined in spherical coordinates in the fixed coordinate system of the head of the spectacle wearer. The predetermined eye-sided visual angle corresponds to the spherical coordinates of the line of sight in the coordinate system of the head of the spectacle wearer. The spherical coordinates are determined in the conventional manner. For example, reference is made to the definition of spherical coordinates in the "Handbook of Mathematics" by Dr. Helmut Wörle and Hans-Joachim Rumpf, 1992, R. Oldenburg Verlag GmbH, Munich. With respect to the definition of spherical coordinates, this book constitutes an integral part of the disclosure of the present patent application. A base plane, described in the "Handbook of Mathematics" may be, for example, a plane, which includes two intersecting straight lines. For example, a straight line may be a straight line connecting two pupil centers of the spectacle wearer. At the same time the eyes are in a position, in which the spectacle wearer is looking in the zero gaze direction. As an alternative, the first straight line may also be the straight line connecting both optical eye rotation points of both eyes of the spectacle wearer. The second straight line may be, for example, a straight line, which intersects the first straight line and which is oriented parallel to the zero gaze direction of the spectacle wearer. The base line, which is also described in the "Handbook of Mathematics" may be, for example, a line, which, starting from the optical eye rotation point of an eye, is oriented parallel to the zero gaze direction of the spectacle wearer. Therefore, the base line lies in the base plane. If the spectacle wearer looks in the zero gaze direction, the base line corresponds to the first line of sight. If, however, the spectacle wearer does not look in the zero gaze direction, the first line of sight does not correspond to the base line. Rather the first line of sight intersects the base plane. The visual angles correspond to the angles, as presented in the "Handbook of Mathematics."

The center of the pupil or rather the center point of the pupil within the meaning of the invention is preferably the center point of a geometric diaphragm of the eye. The pupil center or rather the pupil center point may also be the center point of a sensory diaphragm of the eye. Furthermore, the pupil center or rather the pupil center point, may be, according to the invention, the apex of the cornea.

In other words, the visual angles of a line of sight may be given as the spherical coordinates of the line of sight in the stationary coordinate system of the head. Therefore, the angles are clearly defined on the basis of a base plane and a base line of the coordinate system. The base plane is defined, for example, by the two optical eye rotation points of the spectacle wearer and the zero gaze direction. The base line is, for example, a line of sight in the zero gaze direction. The spherical coordinates of a line of sight are the angles that the line of sight enters into with the base plane and the zero gaze direction. If, for example, the line of sight is projected on the base plane, an angle of the spherical coordinates is the angle between the projection of the line of sight on the base plane and the line of sight. Another angle of the spherical coordinates is the angle between the projection of the line of sight on the base plane and the zero gaze direction, where the zero gaze direction, the line of sight and the projection of the line of sight on the base plane intersect respectively the eye rotation point. In other words, the spherical coordinates are clearly defined preferably by means of the eye rotation point, the zero gaze direction and the two angles, described above.

The coordinate system is advantageously stationary in the reference system of the head of the spectacle wearer. That is, when the head is moved, the visual angle coordinates are not modified.

If the series of spectacle lenses includes spectacle lenses for a plurality of spectacle wearers, for example for five spectacle wearers, a coordinate system is defined for each spectacle wearer in the reference system of a head of each spectacle wearer. Therefore, for five spectacle wearers there exist five independent coordinate systems. Furthermore, for each spectacle lens, which is arranged in front of an eye of one of the spectacle wearers, a first intersection point is defined, at which the first line of sight pierces the eye-sided and/or the object-sided surface of the spectacle lens. In other words, a first line of sight is given in coordinates of the respective coordinate system of each spectacle wearer. Therefore, the first line of sight exhibits identical visual angles for each spectacle wearer—that is, identical coordinates in spherical coordinates in each of the coordinate systems of each spectacle wearer. Expressed differently, a first intersection point is defined for each spectacle wearer. Therefore, the first intersection point is the intersection point of the first line of sight with one of the surfaces of the spectacle lens that is arranged in front of the eye of the respective spectacle wearer.

In conformity with the above example, the five spectacle wearers have five first lines of sight and also five first intersection points. Thus, the visual angles (that is, the spherical coordinates of each first line of sight in the customer-specific coordinate system) are identical. The coordinates of the respective intersection points in the coordinates systems of the respective spectacle lenses may be different from each other. For example, the coordinates of each intersection point in the coordinate system of the associated spectacle lens are given in Cartesian coordinates. The Cartesian coordinates of the five exemplary points are preferably not identical.

The first line of sight has unambiguous coordinates in the coordinate system of the head of the first spectacle wearer. That is, the visual angle in the spherical coordinates of each line of sight can be clearly defined in the coordinate system of the first spectacle wearer. Similarly the first line of sight has unambiguous coordinates in the coordinate system of the head of the second spectacle wearer.

Thus, the coordinates of the first line of sight in the coordinate system of the head of the first wearer are identical to the coordinates of the first line of sight in the coordinate system of the head of the second wearer. For the second spectacle wearer an intersection point of the first line of sight is defined. Thus, just like the first line of sight of the first spectacle wearer in the coordinate system of the first spectacle wearer, the first line of sight of the second spectacle wearer in the coordinate system of the head of the second spectacle wearer exhibits identical visual angles (that is, identical spherical coordinates in the coordinate system of the head of the second spectacle wearer). The same applies to the third, the fourth, and the fifth spectacle wearer. The number of spectacle wearers is not limited to five, but rather there may be any arbitrary number of spectacle wearers.

Furthermore, the eye-sided and/or the object-sided surface of each spectacle lens of the series is configured preferably in such a manner that in the position of use of the spectacle lenses in front of the eyes of the respective spectacle wearers the nominal variables at the intersection points of n-th lines of sight are in essence identical to the respective eye-sided or object-sided surfaces of the spectacle lenses; each n-th line of sight is a predetermined eye-sided line of sight, which intersects a pupil center point and an optical eye rotation point of the respective eye; all n-th lines of sight exhibit a predetermined, identical eye-sided visual angle; and the visual angles of all n-th lines of sight are different from the visual angles of the other lines of sight.

In this case n is a whole number greater than or equal to 2. Thus, the visual angles of all n-th lines of sight are different from each other so that there are no two lines of sight i and j that exhibit identical visual angles.

In other words, the above properties of the spectacle lenses of the series of spectacle lenses are not limited to the respective first lines of sight. Rather the above properties apply to any arbitrary number of lines of sight, where the number can be n lines of sight. Preferably the properties apply to n=2, especially preferably n=10, in particular n=100 lines of sight.

For example, the above properties may apply to two lines of sight per spectacle wearer that is, a first and a second line of sight per spectacle wearer. In the event of a plurality of spectacle wearers, a first and a second line of sight may be given for each spectacle wearer, where the visual angles of the first lines of sight are identical for each spectacle wearer. The visual angles of the second lines of sight are also identical for each spectacle wearer. However, the visual angles of the first lines of sight are different from the visual angles of the second lines of sight. That is, the first line of sight of a spectacle wearer is different from the second line of sight of the same spectacle wearer. If n is preferably equal to 100, then the first, the second, the third, and the one hundredth line of sight exhibit different visual angles. That is, the first, the second, the third, . . . and the one hundredth line of sight of one and the same spectacle wearer are not identical. In the event of a plurality of spectacle wearers the first lines of sight exhibit identical visual angles. That is, the first line of sight of each wearer has identical visual angles that is, identical spherical coordinates in the preferably stationary coordinate system of the head of the respective wearer. The same applies to the second lines of sight, the third lines of sight, . . . and the one hundredth lines of sight.

Preferably at least one line of sight is arranged in such a manner that the intersection point, assigned to the line of sight, lies on one side of the principal line. In other words, for each spectacle wearer there exists at least one line of sight that intersects on one side of the principal line the eye-sided and/or the object-sided surface of the spectacle lens in the position of use in front of the eye of the spectacle wearer. In the position of use the principal line coincides preferably in essence with the principal line of sight when looking downward.

For example, all intersection points lie outside of or on the side of the principal line. In particular, all of the intersection points lie outside of or on the side of the progressive zone and/or outside of the near zone and/or outside of the distance zone of the respective spectacle lens. In other words, preferably all predefined lines of sight of a spectacle wearer, to which the above properties apply, intersect the eye-sided and/or object-sided surface of each spectacle lens, arranged in front of the eye of the spectacle lens, on the side of the progressive zone and/or the near zone and/or the distance zone.

In particular, it applies to all of the aforementioned lines of sight preferably that the visual angle with respect to the zero gaze direction is larger than preferably approximately 10 deg. In other words, it applies to the spherical coordinates of each line of sight that the spherical coordinates are preferably greater than approximately 10 deg.

In particular, the series of spectacle lenses comprises single vision spectacles and multi-focal spectacles.

Furthermore, preferably all spectacle lenses of the series exhibit in essence the same addition and/or in essence the same spherical refractive power.

Preferably the series of spectacle lenses comprises a plurality of spectacle lenses for one and the same spectacle wearer. The spectacle lenses exhibit all preferably different configurations of the eye-sided and/or object-sided surfaces. Owing to the different surface shapes of the eye-sided and/or object-sided surfaces, the spectacle lenses can be arranged in different positions of use in front of the eye of the spectacle wearer. In other words, the customer-specific parameters, which correspond to the various spectacle lenses, vary.

However, the series of spectacle lenses may also comprise a plurality of spectacle lenses for various spectacle wearers. Therefore, the eye-sided and/or object-sided surfaces of the spectacle lenses are configured to correspond to identical prescriptions. In other words, the spectacle lenses exhibit identical spherical powers, cylinder values and axis positions of the cylinders, which correspond in essence to the prescribed values, where the prescribed values are essentially identical. That is, the spectacle wearers, who wear the respective spectacle lenses, exhibit in essence the same ametropia.

It is especially preferred that the eye-sided or object-sided surface of each spectacle lens of the series is different from the eye-sided or object-sided surface of the respective other spectacle lenses of the series.

In other words, the various spectacle lenses of the series may exhibit in essence an identical addition and/or in essence an identical spherical refractive power. However, owing to the different customer-specific parameters that is, the different arrangements of each spectacle lens in front of an eye, the optimized surfaces of the various spectacle lenses differ from each other.

Preferably the eye-sided and/or the object-sided surface of each spectacle lens of the series is configured in such a manner that in the position of use of the spectacle lenses in front of the eyes of exactly one predetermined spectacle wearer, the nominal variables at the intersection points of the first lines of sight are essentially identical to the respective eye-sided or object-sided surfaces of the spectacle lenses.

In other words, the present invention relates preferably to a series of spectacle lenses, wherein each spectacle lens of the series comprises an eye-sided surface and an object-sided surface; the eye-sided and/or the object-sided surface of each spectacle lens of the series is configured in such a manner that in the position of use of the spectacle lenses in front of one eye (or both eyes) of exactly one predetermined spectacle wearer, the nominal variables at the intersection points of a first line of sight are essentially identical to the respective eye-sided or object-sided surfaces of the spectacle lenses; the first line of sight is a predetermined, eye-sided line, which intersects a pupil center point and an optical eye rotation point of the respective eye; and the first line of sight exhibits a predetermined eye-sided visual angle; the nominal variables for each intersection point consist of a maximum permissible difference between a predefined value of a spherical refractive power and an actual value of a spherical refractive power in the position of use, and/or a maximum permissible difference between a predefined value of an astigmatism and an actual value of an astigmatism in the position of use, and/or a maximum permissible difference between a predefined value of a cylinder axis and an actual value of a cylinder axis in the position of use of the respective spectacle lens of the series.

The above applies in particular preferably to a plurality of n lines of sight, where n is preferably two, furthermore preferably five, especially preferably 100 lines of sight.

Furthermore, the present invention applies to a method which is intended for producing a spectacle lens by means of a prefabricated spectacle lens and comprises the following steps:

selecting a prefabricated spectacle lens;

specifying a first intersection point of a surface of the prefabricated spectacle lens in a coordinate system of the prefabricated spectacle lens;

defining a visual angle of a first, eye-sided line of sight, which pierces the surface of the prefabricated spectacle lens in the position of use in front of an eye of a spectacle wearer at the first intersection point, where it holds:

$(\phi_1, \psi_1) = s_{IP}(x_1, y_1);$ specifying the nominal variables $g(\phi 1, \psi 1)$ of the first line of sight;

assigning the nominal variables $g(\phi_1, \psi_1)$ of the first line of sight as the nominal variables $f(x_1, y_1)$ of the first intersection point $(x_1, y_1)$ by means of the equation $f(x_1, y_1) = g(s_{IP}(x_1, y_1))$ and calculating the spectacle lens in consideration of the nominal variables $f(x_1, y_1)$ of the first intersection point $(x_1, y_1)$, starting from the prefabricated spectacle lens, where the nominal variables of the first intersection point consist of a maximum permissible difference between a predefined value of a spherical refractive power and an actual value of a spherical refractive power in the position of use, and/or a maximum permissible difference between a predefined value of an astigmatism and an actual value of an astigmatism in the position of use, and/or a maximum permissible difference between a predefined value of a cylinder axis position and an actual value of a cylinder axis position in the position of use of the spectacle lens series.

the first line of sight ($S_1$) is a line, which intersects at least one pupil center point and an optical eye rotation point of an eye; and $s_{IP}$ is a coordinate transformation, by means of which the coordinates ($x_1, y_1$) of the first intersection point in the coordinate system of the prefabricated spectacle lens are transformed into visual angles ($\phi_1, \psi_1$) of the first eye-sided line of sight in consideration of the customer-specific parameters of the prefabricated spectacle lens in the position of use.

Preferably the prefabricated spectacle lens is not the actually finished spectacle lens, but rather only a data set of a calculated spectacle lens. In particular, the parameters, which are intended for one position of use in front of the eye and which are used for determining or rather calculating the prefabricated spectacle lens and for determining the visual angle of the first, eye-sided line of sight, correspond to the parameters of the position of use of the finished spectacle lens in front of the eye.

In other words, the customer-specific parameters of the finished spectacle lens correspond to the customer-specific parameters, which were used for calculating or determining the prefabricated spectacle lens.

The prefabricated spectacle lens may be, for example, a progressive spectacle lens, which was determined or rather calculated in a conventional manner. In particular, the prefabricated spectacle lens may be determined or rather calculated in the conventional manner with nominal variables as a function of the Cartesian coordinates of the prefabricated spectacle lens.

Preferably the method is carried out by means of n different intersection points. Therefore, at each intersection point exactly one line of sight pierces the surface of the prefabricated spectacle lens; and the respective visual angles of the n lines of sight are different from each other.

If the prefabricated spectacle lens is calculated in the conventional manner with $n_o$ supporting points or rather calculation points, the number of lines of sight or intersection points corresponds preferably to the number of supporting points or rather calculation points that is, $n=n_o$. The supporting points or rather the calculation points are preferably the points of the eye-sided and/or object-sided surface of the prefabricated spectacle lens, by means of which the shape of the corresponding surface is calculated in order to achieve, for example, a predetermined prescription (within the nominal variables).

In other words, the inventive method may be used preferably with a plurality of n lines of sight. Therefore, the intersection point of the first line of sight, the intersection point of the second line of sight, the intersection point of the third line of sight, . . . and the intersection point of the n-th line of sight are specified; and the visual angles of the corresponding lines of sight are defined. In so doing, the visual angles are given in spherical coordinates. In this respect the corresponding coordinate system is a stationary coordinate system with respect to the head of the spectacle wearer and/or a plurality of spectacle wearers.

Furthermore, taking into consideration the customer-specific parameters of the prefabricated spectacle lens, the coordinates of the n intersection points can be transformed preferably into the respective coordinates of the corresponding n lines of sight by means of the coordinate transformation $S_{IP}$. Expressed differently, with the coordinate transformation $S_{IP}$ the coordinates of each intersection point in the preferably Cartesian coordinate system of each spectacle lens can be transformed into visual angles that is, spherical coordinates in the respective coordinate system of a head of a wearer or a head of a plurality of wearers.

It is especially preferred that the inventive method is carried out again for each spectacle lens of a series of spectacle lenses.

Preferably one or more intersection points of a respective surface of a plurality of prefabricated spectacle lenses is/are specified in the respective coordinate system of the prefabricated spectacle lenses. For example, a first, a second, a third, . . . and a one hundredth intersection point for the respective surface of the spectacle lenses are specified for the respective surface of each prefabricated spectacle lens. The coordinates of the first, the second, the third, . . . and the one hundredth intersection point are given in the respective coordinate system of the respective spectacle lens. The coordinates of the first intersection point are identical in the respective coordinate system of the respective spectacle lens. Similarly the coordinates of the second intersection point in the coordinate system of the respective spectacle lens are preferably identical. The same applies to the coordinates of the third to one hundredth intersection points.

Furthermore, the intersection points are not limited to 100 intersection points. Rather it is possible that an arbitrary number of n intersection points may be specified.

The surface of the prefabricated spectacle lens, whose intersection points are specified, may be, for example, an object-sided surface. It may also be an eye-sided surface of the prefabricated spectacle lens.

In another preferred embodiment of the method of the present invention, in a first step at least one reference intersection point $(x_R, y_R)$ of a surface of a reference spectacle lens is determined in a coordinate system of the reference spectacle lens, each reference intersection point $(x_R, y_R)$ is assigned a nominal variable $f(x_R, y_R)$, for each reference intersection point $(x_R, y_R)$ of the reference spectacle lens in the position of use in front of an eye, a visual angle $(\phi, \psi)$ of an eye-sided line of sight is determined in the coordinate system of the eye, said line of sight piercing the surface of the reference spectacle lens in the respective reference intersection point $(x_R, y_R)$, where it holds true:

$(\phi, \psi) = s_{IP}(x_R, y_R)$, the nominal variable of each reference intersection point of the reference spectacle lens is assigned to the nominal variable of the associated line of sight, where it holds true, $g(\phi, \psi) = f_R(x_{IP}(\phi, \psi))$ and $x_{IP}$ is a coordinate transformation, by means of which the visual angles of each line of sight are transformed into coordinates of a corresponding reference intersection point in the coordinate system of the corresponding reference spectacle lens in consideration of the customer-specific parameters of the corresponding reference spectacle lens in the position of use.

As a consequence, a reference spectacle lens is specified preferably before a spectacle lens or a series of spectacle lenses are produced. The reference spectacle lens has preferably a mean spherical power and a moderate astigmatism with a mean axial position that is, a central cylinder with a mean cylinder axis position. Furthermore, preferably average customer-specific parameters are used to represent the reference spectacle lens. Such a spectacle lens may be calculated or determined and optionally also produced, for example, by means of a conventional optimization method. A reference intersection point or a plurality of reference intersection points is/are determined on a surface, which may be an eye-sided or an object-sided surface of the reference spectacle lens. For each of the reference intersection points the nominal variable is known, and/or each of the reference intersection points is assigned a predetermined nominal variable.

Furthermore, for each reference intersection point a line of sight is defined and/or determined. In the position of use of the spectacle lens in front of the eye of an exemplary spectacle wearer said line of sight pierces the corresponding reference intersection point.

In the coordinate system of the spectacle wearer that is, in the coordinate system that is stationary with respect to the head of the spectacle wearer, the visual angles of the respective lines of sight are defined in spherical coordinates. Then the nominal variables of the reference intersection points are assigned to the respective lines of sight, which pierce the corresponding reference intersection points. If, for example, only one reference intersection point is chosen, then the nominal variable of the line of sight, which pierces the reference intersection point in the position of use of the spectacle lens, corresponds to the nominal variable of the reference intersection point. If, for example, a first and a second reference intersection point are specified, the nominal variable of the first intersection point is assigned to the first line of sight, which pierces the first intersection point. Correspondingly the nominal variable of the second intersection point is assigned to the second line of sight, where the second line of sight pierces the surface of the reference spectacle lens at the second intersection point. The same applies correspondingly to a plurality of reference intersection points.

Then the nominal variables of the corresponding lines of sight are used in the inventive method in order to produce one or more spectacle lenses. Therefore, the spectacle lenses may differ by means of the varying customer-specific parameters. Consequently the number of lines of sight, which are used in a preferred embodiment of the inventive method, correspond preferably to the number of points, by means of which the reference spectacle lens is calculated and/or determined. That is, the number of lines of sight corresponds preferably to the number of specified nominal variables.

Furthermore, the method is carried out preferably according to the first step for at least one spectacle lens that is different from the reference spectacle lens.

It is especially preferred that the method is carried out again according to the first step for each spectacle lens of a series of spectacle lenses.

In other words, the nominal variables are given as a function of the Cartesian coordinates of the reference intersection points of the reference spectacle lens; and the lines of sight, which belong to the reference intersection points, are assigned the nominal variables of the corresponding reference intersection points. Thus, the nominal variables may be presented as functions of the visual angles of the respective lines of sight. For any arbitrary number of spectacle lenses, which are then to be produced, the nominal variables are used as a function of the visual angles of the lines of sight. Therefore, for each intersection point of a spectacle lens the corresponding line of sight is determined; and in particular the visual angles of the corresponding line of sight are determined. The nominal variables are assigned to the intersection points of the prefabricated spectacle lenses by distributing the nominal variables as a function of the lines of sight and/or the visual angles of the lines of sight. With these nominal variables the prefabricated spectacle lens can be completely calculated and/or defined and produced.

In other words, in the position of use for the respective spectacle wearer all spectacle lenses of a series of spectacle lenses, which are produced according to the above method, exhibit the same optical quality in a predetermined gaze direction. In this respect the optical properties of the respective spectacle lenses may certainly differ as a function of the Cartesian coordinates of the respective spectacle lenses.

Furthermore, it is not necessary to carry out the assignment of nominal variables for all possible lines of sight and/or various visual angles of lines of sight. Rather, it is enough to assign a certain quantity of lines of sight. For example, the number of lines of sight may depend on a variable of the eye-sided and/or object-sided surface. Preferably the lines of sight may be selected and/or arranged in such a manner that the distance between two adjacent lines of sight in spherical coordinates is preferably approximately 2 deg., in particular preferably approximately 1 deg.

Optionally the nominal variables may be interpolated for lines of sight that are not determined. If, for example, intersection points are specified in such a manner that the intersection points of the corresponding lines of sight are not assigned any nominal variables, the nominal variables of such lines of sight may be interpolated by means of the nominal variables of the adjacent lines of sight.

Another aspect of the present invention is the use of at least one spectacle lens of a series of spectacle lenses for correcting the optical ametropia of at least one spectacle wearer. Thus, said at least one spectacle lens of the series comprises an eye-sided surface and an object-sided surface; the eye-sided and/or the object-sided surface of said at least one spectacle lens of the series is designed in such a manner that in the position of use of said at least one spectacle lens in front of the eyes of the respective spectacle wearers, the nominal variables at the intersection points of the first lines of sight are essentially identical to the respective eye-sided or object-sided surfaces of said at least one spectacle lens; each first line of sight is a predetermined, eye-sided line of sight, which intersects a pupil center point and an optical eye rotation point of the respective eye; and all of the first lines of sight exhibit a predetermined, identical eye-sided visual angle; the nominal variables for each intersection point consist of a maximum permissible difference between a predefined value of a spherical refractive power and an actual value of a spherical refractive power in the position of use, and/or a maximum permissible difference between a predefined value of an astigmatism and an actual value of an astigmatism in the position of use, and/or a maximum permissible difference between a predefined value of a cylinder axis position and an actual value of a cylinder axis position in the position of use of said at least one spectacle lens of the series.

Furthermore, the above statements regarding the series of spectacle lenses also apply in an analogous manner to the use of said at least one spectacle lens of the series of spectacle lenses.

The invention is described below with reference to the attached drawings of preferred embodiments, which are included by way of example.

BRIEF DESCRIPTION OF THE DRAWINGS

FIG. 4 is a top view of FIG. 3.

DETAILED DESCRIPTION OF THE DRAWINGS

Figure 1:
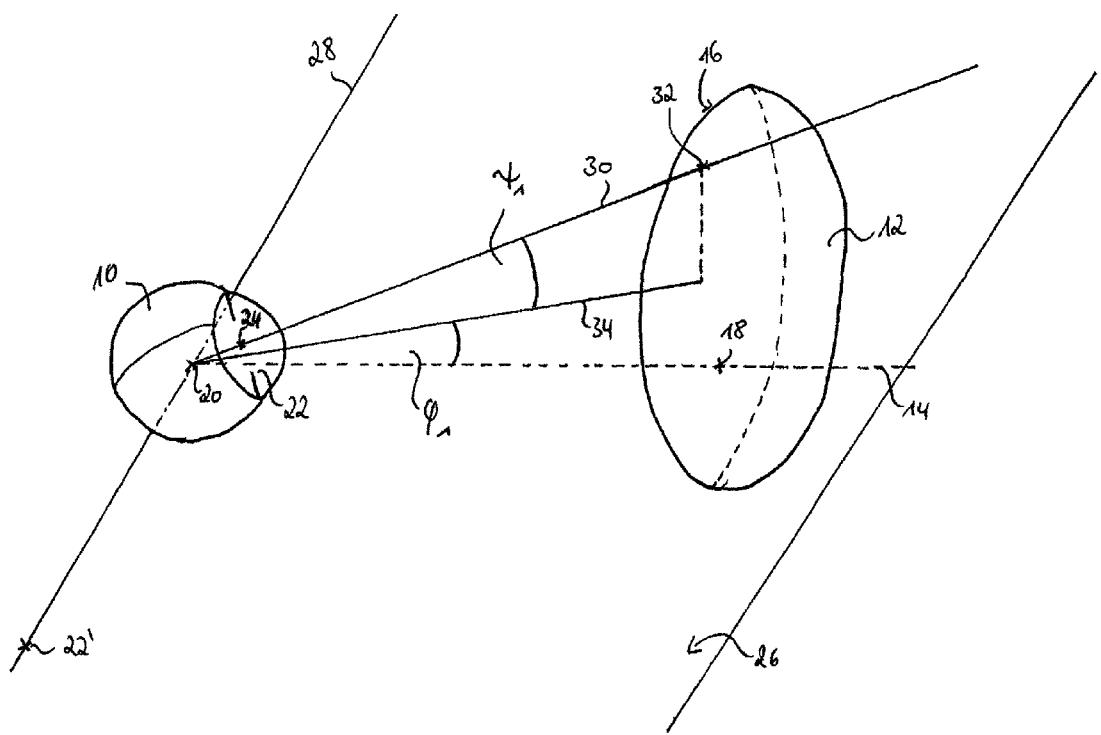
FIG. 1 is a perspective view of an arrangement of a spectacle lens in the position of use in front of an eye of a spectacle wearer.

FIG. 1 is a perspective view of a system of an eye 10 and a first spectacle lens 12 of a spectacle wearer. The first spectacle lens 12 is arranged in such a manner in front of the eye 10 that a line of sight in the zero gaze direction 14 of the eye 10 intersects an eye-sided surface 16 of the first spectacle lens 12 at a zero visual point 18 of the first spectacle lens 12. If the eye 10 is oriented in such a manner that the spectacle wearer looks in the zero gaze direction, the line of sight in the zero gaze direction 14 also intersects an optical eye rotation point 20 and a pupil 22 in the center point 24. Moreover, FIG. 1 shows a base plane 26. In this respect the base plane 26 includes two intersecting straight lines 28, 14. The base plane 26 includes the straight line 28 and the line of sight in the zero gaze direction 14. The straight line 28 intersects the optical eye rotation point 20 of the eye 10 and the optical eye rotation point 20' of a second eye (not illustrated) of the spectacle wearer. If the spectacle wearer looks in the zero gaze direction, the center point 24 of the pupil 22 of the one eye 10 and a center point of the pupil (not illustrated) of the second eye (not illustrated) of the spectacle wearer also lie in the base plane 26. In particular, FIG. 1 shows the eye 10 of the spectacle wearer in an arrangement, in which, starting from the arrangement of the eye 10 in the zero gaze direction, the eye 10 is rotated about the optical eye rotation point 20. Therefore, the spectacle wearer does not look in the zero gaze direction, but rather in a direction that is different from the zero gaze direction. The gaze direction, in which the spectacle wearer looks, is depicted by a first line of sight 30. The first line of sight 30 intersects the optical eye rotation point 20 and the center point 24 of the pupil 22 of the eye 10. Furthermore, the first line of sight 30 pierces the eye-sided surface 16 in a first intersection point 32. Furthermore, a visual angle ($\phi_1$, $\psi_1$) of the first line of sight 30 is shown. In particular, the visual angle of the first line of sight 30 is given in spherical coordinates, where the spherical coordinates relate to a stationary coordinate system with respect to a head (not illustrated) of the spectacle wearer. In particular, the coordinate system is defined by the base line 26 and the line of sight in the zero gaze direction 14.

The first line of sight 30, depicted in FIG. 1, intersects the base plane 26 at the optical eye rotation point 20. Furthermore, FIG. 1 shows a projection 34 of the first line of sight on the base plane 26. In spherical coordinates the result is an azimuth angle $\phi_1$ as the angle between the projection 34 of the first line of sight 30 on the plane 26 and the line of sight in the zero gaze direction 14. An inclination angle $\psi_1$ represents the intersecting angle of the first line of sight 30 with the base plane 26. That is, the inclination angle $\psi_1$ is an angle between the first line of sight 30 and the projection 34 of the first line of sight 30 on the base plane 26. If the spectacle wearer looks in the zero gaze direction, both the azimuth angle $\phi_1$ and the inclination angle $\psi_1$ equal 0 deg. Therefore, the first line of sight 30 is clearly defined in spherical coordinates. At the same time the visual angle of the first line of sight 30 is defined by the azimuth angle $\phi_1$ and the inclination angle $\psi_1$. When the gaze direction of the eye 10 changes, the visual angle that is, the azimuth angle $\phi$ and/or the inclination angle $\psi$ changes.

Two different lines of sight for example, the first line of sight 30 and a second line of sight (depicted in FIGS. 2 to 4) differ in at least one of the two angles of the spherical coordinates. That is, they differ in the azimuth angle $\phi$ and/or the inclination angle $\psi$. Consequently for each arbitrary spectacle wearer each line of sight may be clearly represented in spherical coordinates in a stationary coordinate system of the head of the spectacle wearer.

Figure 2:
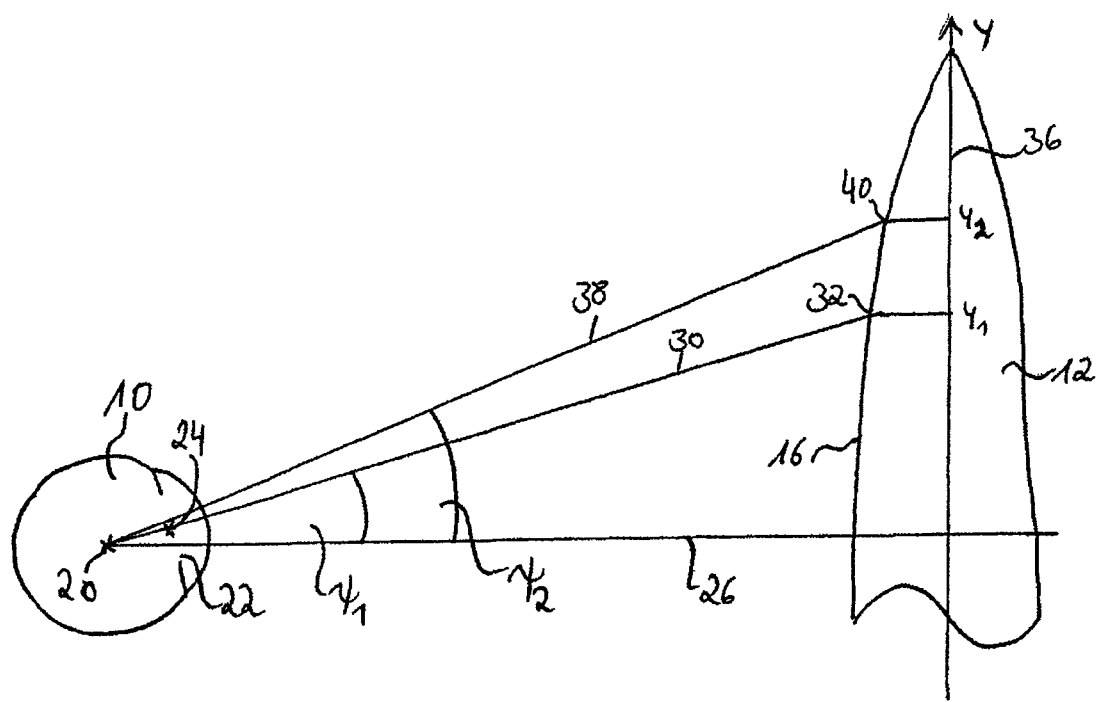
FIG. 2 is a sectional view of FIG. 1.

FIG. 2 is a vertical sectional view of FIG. 1 that is, a sectional view along the line of sight in the zero gaze direction 14 orthogonal to the base plane 26. The base plane 26 is orthogonal to the drawing plane of FIG. 2. Consequently the azimuth angle $\phi_1$ is not visible in FIG. 2, but rather only the inclination angle $\psi_1$ of the first line of sight 30. The first line of sight intersects the eye-sided surface 16 of the first spectacle lens 12 at the first intersection point 32. Furthermore, FIG. 2 shows a y-axis of the first spectacle lens 12. A projection of the first intersection point 32 on the y-axis yields a y-coordinate $y_1$ of the first intersection point 32. Furthermore, FIG. 2 shows a second line of sight 38. The second line of sight 38 corresponds to a modified gaze direction of the eye 10. A modified gaze direction of the eye 10 is achieved by rotating the eye 10 about the optical eye rotation point 20. That is, the position of the center point 24 of the pupil 22 in the stationary coordinate system of the head of the spectacle wearer is changed. As the gaze angle changes, the optical eye rotation point 20 remains unchanged.

In particular, the second line of sight 38 intersects the optical eye rotation point 20 and the center point 24 of the pupil 22 of the eye 10. As FIG. 2 shows, the second line of sight 38 exhibits an inclination angle $\psi_2$, which is different from the inclination angle $\psi_1$ of the first line of sight 32. Consequently the second line of sight 38 intersects the eye-sided surface 16 of the first spectacle lens 12 at a second intersection point 40. A projection of the second intersection point 40 on the y-axis yields a y-coordinate $y_2$ of the second intersection point 40.

Figure 3:
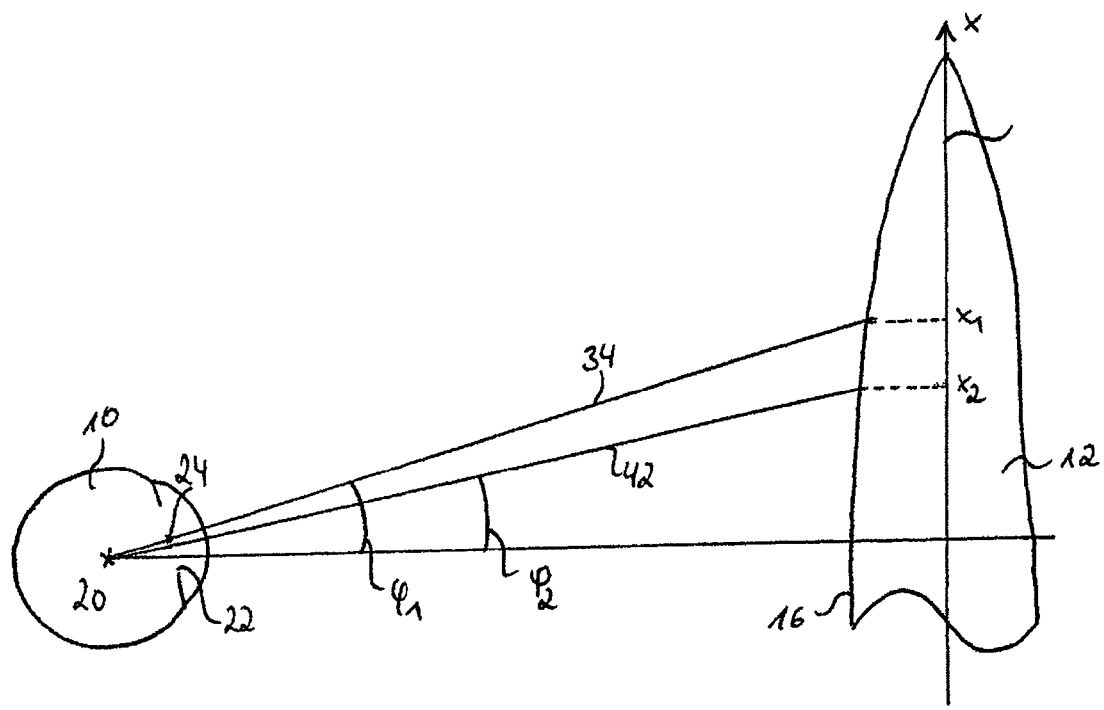
FIG. 3 is a top view of FIG. 1.

FIG. 3 is a sectional view of FIG. 1 along the base plane 26. FIG. 3 depicts the projection 34 of the first line of sight 30 on the base plane 26. FIG. 3 shows in an analogous manner a projection 42 of the second line of sight 38 on the base plane 26. Furthermore, FIG. 3 shows a projection of the first intersection point 32 on an x-axis and a projection of the second intersection point 40 on the x-axis. The projection of the first intersection point 32 on the x-axis yields an x coordinate $x_1$ of the first intersection point 32. The projection of the second intersection point 40 on the x-axis yields in an analogous manner an x coordinate $x_2$ of the second intersection point 40.

FIG. 3 shows only the azimuth angle $\phi_1$ of the first line of sight 30 and an azimuth angle $\phi_2$ of the second line of sight 42. The inclination angles $\psi_1$ and $\psi_2$ are not visible on account of the chosen sectional plane in FIG. 3.

FIG. 4 is a sectional view of FIG. 3. However, instead of the first spectacle lens 12, there is a second spectacle lens 44; and the second spectacle lens 44 exhibits arrangements that are different from the arrangement shown in FIGS. 1 to 3. In particular, a frame disk angle, at which the second spectacle lens 44 of FIG. 4 is arranged, is different from the frame disk angle, at which the first spectacle lens 12 of FIG. 3 is arranged. Therefore, if the first line of sight 30 and the second line of sight 38 are identical, the x coordinates of the first intersection point 32 and of the second intersection point 40 change. The first intersection point 32 has an x coordinate $x_1'$. The second intersection point 40 has an x coordinate $x_2'$.

If the first spectacle lens 12 is arranged in front of the eye 10 of the spectacle wearer, the first spectacle lens 12 exhibits the predetermined nominal variables at the first intersection point 32. For example, the specified spherical power at the first intersection point 32 is 1 dpt. However, the actual spherical power at the first intersection point 32 may deviate from the specified value. A maximum deviation of the specified spherical power from the actual spherical power is called the nominal variable. For example, the nominal variable at the first intersection point 32 may be 0.5 dpt. As a result, the actual present value of the spherical power may be, for example, 1.5 dpt.

Given in coordinates of the coordinate system of the first spectacle lens 12, the actual spherical power is 1.5 dpt at the first intersection point 32 with the coordinates $(x_1, y_1)$.

In an analogous manner a specific prescription for example, 1.5 dpt may be specified at the second intersection point 40 of the second line of sight 38; and correspondingly a nominal variable for example, 1.0 dpt may also be given for the second line of sight 38. Consequently the actual value of the spherical power at the second intersection point 40 may be, for example, 2.5 dpt.

If, instead of the first spectacle lens 12, the second spectacle lens 44 is arranged in front of the eye 10 of the spectacle wearer in the position of use, both the first line of sight 30 and the second line of sight 38 pierce an eye-sided surface 46 of the second spectacle lens 44. As a result, there is again a first intersection point 32 and a second intersection point 40. However, in the coordinate system of the second spectacle lens 44 both the first intersection point 32 and the second intersection point 40 exhibit coordinates, which differ from the coordinates of the first intersection point 32 and the second intersection point 40 in the coordinate system of the first spectacle lens 12. The coordinates of the first intersection point 32 in the coordinate system of the second spectacle lens 44 are, for example, $(x_1', y_1')$. The coordinates of the second intersection point 40 in the coordinate system of the second spectacle lens 44 are, for example, $(x_2', y_2')$. However, the nominal variable for the first intersection point is independent of the spectacle lens. That is, it is also, for example, 0.5 dpt at the first intersection point 32 of the first line of sight 30 through the eye-sided surface 46 of the second spectacle lens 44. Similarly the nominal variable of the second intersection point 40 of the second line of sight 38 through the eye-sided surface 46 of the second spectacle lens 44 is, for example, 1 dpt. If in turn the actual value of the spherical power is determined at the first intersection point 32 or at the second intersection point 40, which is located inside a range of values comprising the prescribed spherical power at the respective intersection point and the nominal variable.

The prescribed spherical power at the first intersection point 32 of the first line of sight 30 through the eye-sided surface 46 of the second spectacle lens 44 may be, for example, 1.5 dpt. The actual spherical power at the second intersection point 40 of the second line of sight 38 through the eye-sided surface 46 of the second spectacle lens 44 is, for example, 2.5 dpt (which is within the nominal variable of 1 dpt). Consequently, irrespective of whether the first spectacle lens 12 or the second spectacle lens 44 is arranged in front of the eye 10, the spectacle wearer has the same subjective feeling of visual quality.

The above specification was described by way of example for two spectacle lenses 12, 44 and two lines of sight 30, 38. However, the same also applies to a plurality of lines of sight, for example, approximately 100 lines of sight. Similarly the above designs apply in an analogous manner to a plurality of spectacle lenses. Furthermore, the number of lines of sight may also vary as the spectacle lens changes. For example, the lines of sight may be arranged in such a manner that the azimuth angles and/or inclination angles of adjacent lines of sight of an eye differ by a predetermined angle, preferably approximately 5 deg., especially preferably approximately 2 deg., in particular approximately 1 deg. If two different spectacle lenses 12, 44 exhibit, for example, different magnitudes of the eye-sided surfaces, then a varying number of lines of sight also pierce, for example, the respective surfaces.

Furthermore, it is also possible that the above description applies to a plurality of spectacle wearers. In other words, the nominal variables that is, the deviation of the actual existing optical properties from the prescribed values at the intersection points of the lines of sight are identical to the essentially identical visual angles through the eye-sided surfaces of the spectacle lenses for each wearer. Optical properties are, for example, the spherical power, cylinder and the axis position of the cylinder. For a plurality of spectacle wearers, there may be, for example, a first line of sight, where for each spectacle wearer the first line of sight exhibits the azimuth angle $\phi_1$ and the inclination angle $\psi_1$.

For each spectacle wearer the value of the azimuth angle $\psi_1$ is identical to the value of the azimuth angle $\psi_1$ of the other spectacle wearers. In an analogous manner the value of the inclination angle $\psi_1$ for each spectacle wearer is identical to the value of the inclination angle $\psi_1$ of the other spectacle wearers. Therefore, for each first line of sight the maximum deviation from the prescribed value of an optical variable and the actual value of this optical variable is identical at the corresponding intersection point. The subjective visual perception corresponds exactly to this deviation. If the actual value of the optical variable is identical to the prescribed value of the optical variable, the visual defect of the spectacle wearer is accurately compensated. That is, the spectacle wearer has an optical visual feeling as if he had no optical ametropia. If, however, the actual value deviates from the prescribed value the visual defect is not completely compensated the spectacle wearer has a subjective negative visual feeling. The deviation of the actual value from the prescribed value is described by the nominal variable. If for a predetermined line of sight that is, a certain visual angle the nominal variable for all spectacle wearers and all possible spectacle lenses, arranged in front of the eye of the respective spectacle wearer, is identical, then all spectacle wearers for all possible spectacle lenses will have the same subjective visual feeling at this specific visual angle. If this holds true for a plurality of specific visual angles that is, for a plurality of predetermined lines of sight, then for each of these visual angles that is, for each of these lines of sight the plurality of spectacle wearers will have the same subjective visual feeling, irrespective of which of the spectacle lenses (assigned to the respective spectacle wearer) is arranged in front of the respective eye of the spectacle wearer.

The above designs were described by way of example with reference to the values for the spherical power at the respective intersection points. However, this also applies, according to the invention, to other optical variables, for example the cylinder (that is, the value of the astigmatism) and/or the cylinder axis (that is, the axis position of the astigmatism) at the corresponding intersection points.

LIST OF REFERENCE NUMERALS 10 eye
12 first spectacle lens
14 line of sight in the zero gaze direction
16 eye-sided surface
18 zero visual point
20 optical eye rotation point
20' optical eye rotation point
22 pupil
24 center point
26 base plane
28 straight line
30 first line of sight
32 first intersection point
34 projection
36 y-axis
38 second line of sight
40 second intersection point
42 projection
44 second spectacle lens
46 eye-side surface

What is claimed is:

1. Series of spectacle lenses in which each spectacle lens of the series comprises an eye-sided surface and an object-sided surface; wherein the eye-sided and/or the object-sided surface of each spectacle lens of the series is configured so that in a position of use of the spectacle lenses in front of the eyes of respective spectacle wearers, nominal variables ($f(x_1, y_1), f(x'_1, y'_1), g(\phi_1, \psi_1)$) at the intersection points of first lines of sight are essentially identical to the respective eye-sided or object-sided surfaces of the spectacle lenses;

each of the first lines of sight is a predetermined, eye-sided line, which intersects a pupil center point and an optical eye rotation point of a respective eye; and all of the first lines of sight have a predetermined, identical eye-sided visual angle ($\phi_1, \psi_1$); with the nominal variables ($f(x_1, y_1), f(x'_1, y'_1), g(\phi_1, \psi_1)$) for each intersection point consisting of at least one of a maximum permissible difference between a predefined value of a spherical refractive power and an actual value of a spherical refractive power in the position of use, and a maximum permissible difference between a predefined value of a cylinder axis position and an actual value of a cylinder axis position in the position of use of the respective spectacle lens of the series.

2. Series of spectacle lenses as claimed in claim 1, wherein at least one of the eye-sided and the object-sided surface of each spectacle lens of the series is further configured, so that in the position of use of the spectacle lenses in front of the eyes of respective spectacle wearers, the nominal variables at the intersection points of n-th lines of sight are in essentially identical to the respective eye-sided or object-sided surfaces of the spectacle lenses;

each n-th line of sight is a predetermined eye-sided line that intersects a pupil center point and an optical eye rotation point of the respective eye;

all n-th lines of sight have a predetermined, identical eye-sided visual angle ($\phi_2, \psi_2$); and the visual angles ($\phi_2, \psi_2$) of all n-th lines of sight are different from the visual angles ($\phi_1, \psi_1$) of the other lines of sight.

3. Series of spectacle lenses, as claimed in claim 2, wherein n=2, preferably n=5, and especially preferred n=100.

4. Series of spectacle lenses, as claimed in claim 1, wherein all of the spectacle lenses of the series have an essentially identical addition.

5. Series of spectacle lenses, as claimed in claim 1, wherein the eye-sided or object-sided surface of each spectacle lens of the series is different from the eye-sided or object-sided surface of respective other spectacle lenses of the series.

6. Series of spectacle lenses as claimed in claim 1, wherein the eye-sided and/or the object-sided surface of each spectacle lens of the series is configured so that in the position of use of the spectacle lenses in front of the eyes of exactly one predetermined spectacle wearer, the nominal variables ($f(x_1, y_1), (f(x'_1, y'_1), g(\phi_1, \psi_1)$) at the intersection points of the first lines of sight are essentially identical to the respective eye-sided or object-sided surfaces of the spectacle lenses.

7. Method for producing a spectacle lens by way of a prefabricated spectacle lens, comprising:

selecting a prefabricated spectacle lens;

specifying a first intersection point ($x_1, y_1$), ($x'_1, y'_1$) of a surface of the prefabricated spectacle lens in a coordinate system of the prefabricated spectacle lens;

defining a visual angle ($\phi_1, \psi_1$) of a first, eye-sided line of sight, that pierces the surface of the prefabricated spectacle lens in the position of use in front of an eye of a spectacle wearer at the first intersection point ($x_1, y_1$), ($x'_1, y'_1$), where:

$$(\phi_1, \psi_1) = s_{IP}(x_1, y_1);$$

specifying the nominal variables ($g(\phi_1, \psi_1)$) of the first line of sight;

assigning the nominal variables $(g(\phi_1, \psi_1))$ of the first line of sight as the nominal variables $(f(x_1, y_1), f(x'_1, y'_1))$ of the first intersection point $(x_1, y_1), (x'_1, y'_1)$ by satisfying $$f(x_1, y_1) = g(s_{IP}(x_1, y_1));$$

and calculating the spectacle lens in consideration of the nominal variables $(g(\phi_1, \psi_1), f(x_1, y_1), f(x'_1, y'_1))$ of the first spectacle lens point $(x_1, y_1), (x'_1, y'_1)$ starting from the prefabricated spectacle lens, where the nominal variables $(g(\phi_1, \psi_1), (f(x_1, y_1), f(x'_1, y'_1))$ of the first intersection point $(x_1, y_1), (x'_1, y'_1)$ comprise at least one of a maximum permissible difference between a predefined value of a spherical refractive power and an actual value of a spherical refractive power in the position of use, a maximum permissible difference between a predefined value of an astigmatism and an actual value of an astigmatism in the position of use, and a maximum permissible difference between a predefined value of a cylinder axis position and an actual value of a cylinder axis position in the position of use of the spectacle lens, wherein the first line of sight is a line that intersects at least one pupil center point and an optical eye rotation point of an eye; and $s_{IP}$ is a coordinate transformation, by way of which the coordinates $(x_1, y_1)$ of the first intersection point in the coordinate system of the prefabricated spectacle lens are transformed into visual angles $(\phi_1, \psi_1)$ of the first eye-sided line of sight in consideration of the customer-specific parameters of the prefabricated spectacle lens in the position of use.

8. Method, as claimed in claim 7, wherein the method is carried out with n different intersection points, where at each intersection point exactly one line of sight pierces the surface of the prefabricated spectacle lens; and the respective visual angles $((\phi_1, \psi_1), (\phi_2, \psi_2))$ of the n lines of sight are different from each other.

9. Method, as claimed in claim 7, wherein the method is carried out again for each spectacle lens of a series of spectacle lenses.

10. Method, as claimed in claim 9, wherein the method is carried out with n different intersection points, where at each intersection point exactly one line of sight pierces the surface of the prefabricated spectacle lens; and the respective visual angles $((\phi_1, \psi_1), (\phi_2, \psi_2))$ of the n lines of sight are different from each other.

11. Method, as claimed in claim 7, wherein in a first step at least one reference intersection point $(x_R, y_R)$ of a surface of a reference spectacle lens is determined in a coordinate system of the reference spectacle lens, each reference intersection point $(x_R, y_R)$ is assigned a nominal variable $f_R(x_R, y_R)$, for each reference intersection point $(x_R, y_R)$ of the reference spectacle lens in the position of use in front of an eye, a visual angle $(\phi, \psi)$ of an eye-sided line of sight is determined in the coordinate system of the eye, said line of sight piercing the surface of the reference spectacle lens in the respective reference intersection point $(x_R, y_R)$, where:

$$(\phi, \psi) = s_{IP}(x_R, y_R),$$

the nominal variable $f_R(x_R, y_R)$ of each reference intersection point $(x_R, y_R)$ of the reference spectacle lens is assigned to the nominal variable $g(\phi, \psi)$ of the associated line of sight, where, $$g(\phi, \psi) = f_R(x_{IP}(\phi, \psi))$$

and $x_{IP}$ is a coordinate transformation, by way of which the visual angles $(\phi, \psi)$ of each line of sight are transformed into coordinates $(x_R, y_R)$ of a corresponding reference intersection point in the coordinate system of the corresponding reference spectacle lens in consideration of the customer-specific parameters of the corresponding reference spectacle lens in the position of use.

12. Method, as claimed in claim 11, wherein the method is carried out with n different intersection points, where at each intersection point exactly one line of sight pierces the surface of the prefabricated spectacle lens; and the respective visual angles $((\phi_1, \psi_1), (\phi_2, \psi_2))$ of the n lines of sight are different from each other.

13. Method, as claimed in claim 11, wherein the method is carried out, according to the first step, for at least one spectacle lens that is different from the reference spectacle lens.

14. Method, as claimed in claim 11, wherein the method is carried out again, according to the first step, for each spectacle lens of a series of spectacle lenses.

15. Method, as claimed in claim 14, wherein the method is carried out, according to the first step, for at least one spectacle lens that is different from the reference spectacle lens.

* * * * *